United States Patent [19]
Keller et al.

[11] Patent Number: 5,947,514
[45] Date of Patent: Sep. 7, 1999

[54] VALVE CONTROLLED AUTOMOTIVE PYROTECHNIC SYSTEMS

[75] Inventors: Gerald Keller, Shelby Township, Macomb County, Mich.; Niels Dybro, Cedar Falls, Iowa; Jason Raines, Harrison Township, Macomb County; Jeffrey Sikorski, Sterling Heights, both of Mich.

[73] Assignee: Breed Automotive Technology, Inc., Lakeland, Fla.

[21] Appl. No.: 09/026,636

[22] Filed: Feb. 20, 1998

[51] Int. Cl.[6] ...................................................... B60R 21/28
[52] U.S. Cl. ........................... 280/742; 280/735; 280/736
[58] Field of Search .................................... 280/735, 734, 280/736, 741, 742; 180/271; 701/45, 46; 137/588, 625.64, 625.67

[56] References Cited

U.S. PATENT DOCUMENTS

| | | | |
|---|---|---|---|
| 3,834,412 | 9/1974 | Fannin | 137/68 |
| 3,861,710 | 1/1975 | Okubo | 280/150 B |
| 3,900,211 | 8/1975 | Russell et al. | 280/150 AB |
| 4,070,604 | 1/1978 | Usry | 318/203 A |
| 5,085,402 | 2/1992 | O'Dell | 251/129.21 |
| 5,413,378 | 5/1995 | Steffens, Jr. et al. | 280/735 |
| 5,707,078 | 1/1998 | Swanberg et al. | 280/739 |

*Primary Examiner*—Kenneth R. Rice
*Attorney, Agent, or Firm*—Markell Seitzman

[57] ABSTRACT

An adaptively controlled safety restraint system (20) is disclosed which includes a safety restraint device (22, 24) operative in response to a flow of pressurized gas, and fluid means (28) having a stored energy device (30) which can be activated to produce pressurized gas which is discharged through a conduit network (34, 36) for driving the safety restraint device (22, 24). The system further includes a throttling valve assembly (32, 58) disposed between the fluid means (28) and the safety restraint device (22, 24) for controllably varying the output of the fluid means (28). The throttling valve assembly (32, 58) is controlled by an electrical signal received from a crash management controller (38).

20 Claims, 12 Drawing Sheets

VALVE CONTROLLED AUTOMOTIVE PYROTECHNIC SYSTEMS

BACKGROUND AND SUMMARY OF THE INVENTION

The present invention relates generally to an adaptive safety restraint system. In particular, the present invention is directed to a safety restraint system employing an electrically actuated throttling or control valve device for adaptively controlling the output of an inflator during air bag inflation.

Safety restraint systems are used in motor vehicles for protecting the vehicle occupants during collisions. In addition to seat belts, many safety restraint systems now include a driver-side air bag mounted in the steering wheel and a passenger-side air bag mounted in the dashboard. Furthermore, recent attention has been directed to incorporation of other restraint devices such as, for example, side air bags, seat belt pretensioners, and energy management retractors into the safety restraint system. Many, if not all, of these restraint devices are activated by the vehicle's crash management system in response to detection of a vehicular collision exceeding a predetermined impact magnitude.

Many air bag and safety restraint devices such as a pretensioner (also called a belt tightener) are deployed in response to activation of an inflator or other pyrotechnic, gas generating device by the vehicle's crash management system. Typically, activation of the inflator (pyrotechnic device) generates a predetermined output, based on the magnitude of gas or propellant discharge, for deploying its associated air bag or safety restraint device. However, in order to optimize occupant protection during a collision, it is desirable to vary the deployment characteristics of the air bags and/or the operational characteristics of the other restraint devices based on various control parameters such as, for example, the severity of the crash, belt usage, and the position, size and weight of the seat occupant. Thus, the vehicle's crash management system includes various sensors for detecting and/or measuring such control parameters and a controller for adaptively varying the inflator output in response to the sensor signals.

One method for regulating the output of an inflator is through the use of an inflator having two or more separate stored energy devices, commonly referred to as a multi-level inflator. Typically, such multi-level inflators include a first stored energy device, that is, a quantity of propellant which burns to produce the inflation gas and an initiator (squib or detonator) to cause the propellant to burn and a second stored energy device having a different amount of propellant, each of which can be independently activated. In response to a relatively minor crash, only the first stored energy device is activated. Likewise, in a more severe crash, only the second stored energy device is activated. However, in a high severity crash, both stored energy devices are simultaneously activated for providing maximum inflator output. Multi-level inflators can alternatively be used for regulating inflator output in response to the size of the vehicle occupant, if used in conjunction with the appropriate occupant detection sensors. However, multi-level inflators are expensive to manufacture because of the need to integrate two separate stored energy devices into a single inflator unit. Moreover, even if only one of the stored energy devices is discharged, the entire inflator must still be replaced.

Accordingly, it is desirable to provide a lower cost system for controlling the mass flow and pressure of gas generated by the inflator. One such approach is to provide a single inflator having one or more control valve devices for selectively modulating the inflator output and adaptively controlling the deployment force provided to the safety restraint device.

Accordingly, the present invention is directed to an adaptively controlled safety restraint system. The safety restraint system includes a safety restraint device operative in response to a flow of pressurized gas, and an inflator having a stored energy device which can be activated to produce pressurized gas which is discharged through an exhaust port for driving a single safety restraint device or a plurality of such devices communicated to the inflator with a manifold and conduit. The safety restraint system further includes a valve assembly disposed between the inflator and the safety restraint device for controllably varying or throttling the output of the inflator. The valve assembly is controlled by an actuator(s) in response to an electrical signal received from a crash management controller.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

The present invention is directed to a low-cost air bag inflator employing an electrically actuated throttling valve for modulating the output of the air bag inflator and controlling the deployment force of the device or devices comprising the safety restraint system.

Figure 1A:
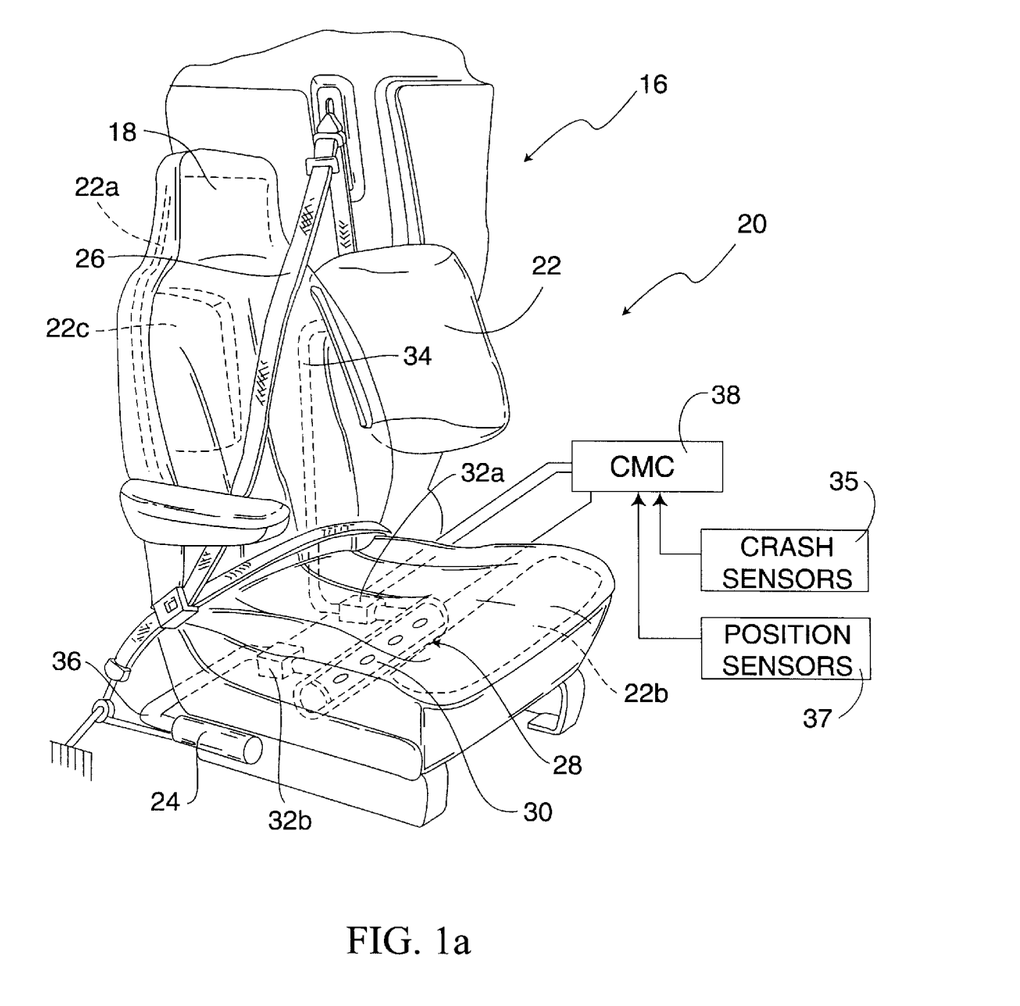
FIG. 1A is an environmental view of a vehicular seating unit showing the safety restraint system according to the present invention.

With reference to FIG. 1A, an exemplary passenger compartment 16 is shown to include a seat assembly 18 and a safety restraint system 20. In particular, safety restraint system 20 includes a side air bag 22 associated with the left side of seat assembly 18 and a seat belt pretensioner 24 for taking up slack in seat belt 26. A manifold assembly 28 which houses a stored energy device 30 can be contained below seat 18 or at another convenient location relative to the devices to be controlled. As disclosed, stored energy device 30 is preferably a gas generator such as any known pyrotechnic, hybrid, liquid or other known inflator which releases energy in the form of pressurized gas upon activation by the vehicle's crash management controller 38. However, one skilled in the art will readily appreciate that a variety of similar stored energy devices may be used at each seating position in accordance with the present invention.

A plurality of throttling valve modules 32a, 32b, which may include pintle valves, spool valves (see FIG. 11) or other electrically control valves, are connected to manifold 28 and modulate and/or control the pressurized gas discharged from stored energy device 30, through manifold 28 and into conduits 34, 36. As shown, conduit 34 provides side air bag 22 with pressurized gas and conduit 36 provides seat belt pretensioner 24 with pressurized gas. Other conduits may extend from a central source of inflation gas (the device 30) with additional valve modules to control the communication of inflation gases to a rear impact air bag 22a, located in the back of the seat to urge the upholstered seat against the back of the occupant to support the back of the occupant during a rear impact or collision, a knee or thigh air bag 22b located in the front top portion of the seat to raise the elevation of the front portion of the seat to limit the occupant's tendency to submarine during a frontal collision, and a center air bag 22c which is housed within the seat to prevent the occupant from moving toward the center of the vehicle during a side impact collision (or an oblique impact). The added conduits and valves or valve modules may also be communicated to a seat belt retractor pretensioner which upon receipt of the inflation gas causes the spool of the retractor to reverse rotate thereby winding (retracting) the seat belt thereon to reduce slack about the occupant. The operation of valve modules 32a, 32b is controlled by the vehicle's crash management controller 38 which determines the position of the pintle member 78 (FIG. 2) for controlling the inflator gas pressure and mass flow delivered to each safety restraint device.

Crash management controller 38 receives signals from various crash sensors 35 and occupant position sensors 37 located at various points within the vehicle to determine the type and severity of the impact. While only crash sensors 35 and occupant position sensors 37 are shown, it should be understood that many different types of sensors can provide signals to crash management controller 38 including, but not limited to, occupant weight and/or proximity sensors, child seat sensors, and temperature and other environmental condition sensors.

As disclosed by the present invention, the operation of side air bag 22 and pretensioner 24 may be independently controlled by crash management controller 38 in response to the information received from sensors 35, 37, and only requires the activation of a single stored energy device 30. For example, in a head-on collision, crash management controller 38 may determine that only pretensioning of seat belt 26 is required. This is accomplished by opening pintle valve 32b for operating pretensioner 24, and closing pintle valve 32a for preventing deployment of side air bag 22. Alternatively, crash management controller 38 may open both pintle valves 32a, 32b for simultaneously operating both devices 22, 24. In addition, the amount or degree of opening of pintle valve 32a can be modulated for providing less inflator output to air bag 22, thereby decreasing the deployment force of the air bag as it inflates, such as during a lower severity crash scenario. Moreover, the frequency at which throttling or control valves 32a, 32b are modulated can also be controlled by crash management controller 38. As will be appreciated, throttling valve modules 32a, 32b provide considerable flexibility to safety restraint system 20.

Figure 1B:
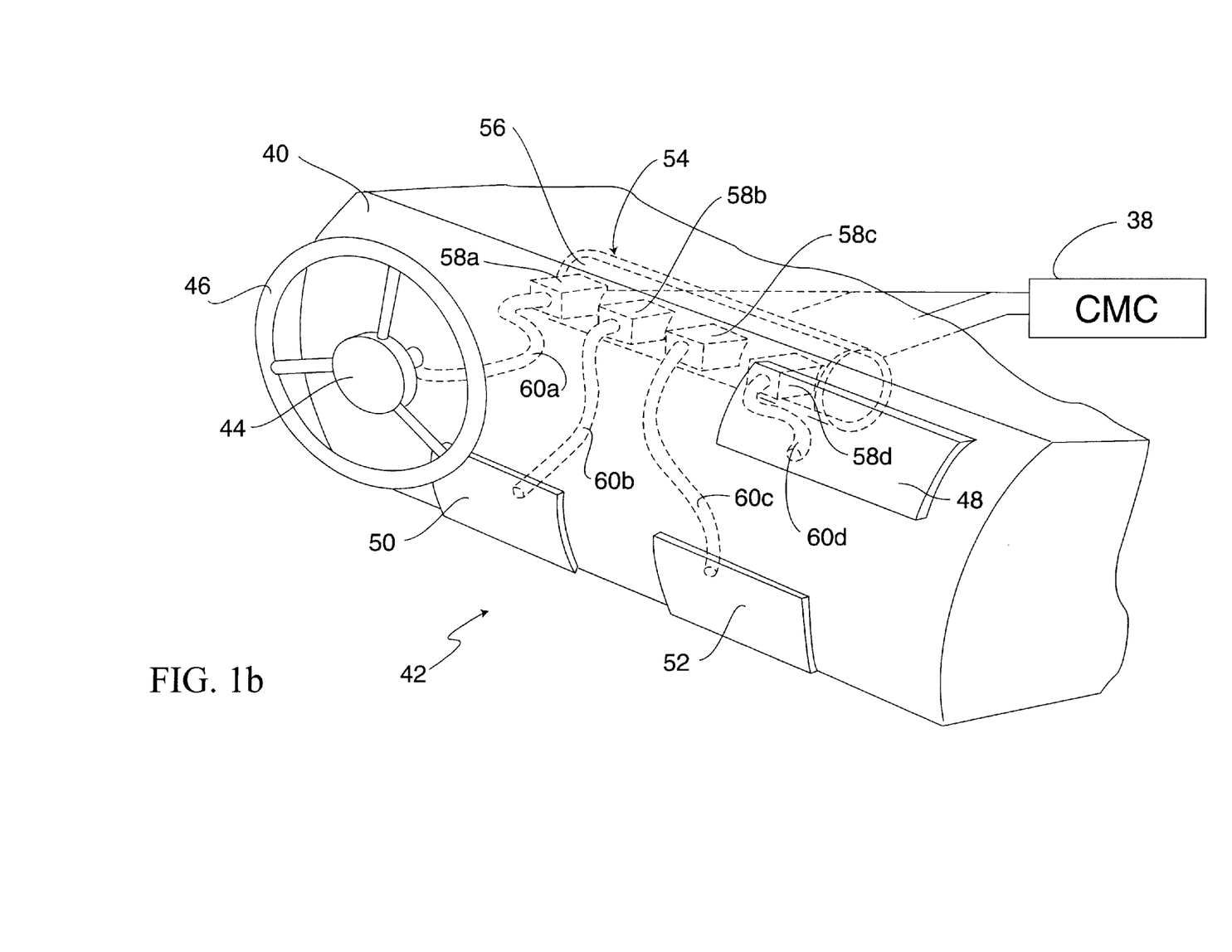
FIG. 1B is an environmental view of a vehicular dashboard module showing a safety restraint system also in accordance with the present invention.

Turning now to FIG. 1B, an exemplary front dashboard module 40 is disclosed as having a safety restraint system 42 installed therein. Safety restraint system 42 includes a driver air bag 44 mounted within a steering wheel 46, a passenger air bag 48 mounted within a dashboard module 40, and driver and passenger knee bolster air bags 50, 52 which are deployed from the lower portion of dashboard module 40. A manifold assembly 54 for housing a large stored energy device 56 is secured behind or underneath dashboard module 40. Preferably, stored energy device or gas source 56 can be a pyrotechnic, hybrid, liquid or other known inflation device which releases pressurized gas into manifold assembly 54 upon activation by the vehicle's crash management controller 38. As shown, four pintle valve modules 58a–58d are in fluid communication with manifold assembly 54. Each device within safety restraint system 42 is connected to its associated throttling valve module by a conduit 60a–60d. As shown, driver air bag 44 is connected to conduit 60a, driver knee bolster 50 is connected to conduit 60b, passenger knee bolster 52 is connected to conduit 60c, and passenger air bag 48 is connected to conduit 60d. Upon activation of stored energy device 56, pressurized gas is provided to pintle valve modules 58a–58d for controlled distribution to the individual safety restraint devices 44, 48, 50, 52 through conduits 60a–60d.

As disclosed above, each device within safety restraint system 42 can be independently operated, and the deployment force of each device controlled or modulated by valves 58a–58d and crash management controller 38. Accordingly, crash management controller 38 may selectively operate the devices within safety restraint system 42 depending on the type and severity of a given crash scenario in a similar manner as described above. Moreover, using one stored energy device 30 or 56 also provides several advantages. More specifically, one squib may be used to activate or inflate four or more safety restraint devices. Further, only one stored energy device 30 or 56 must be replaced after being discharged. These advantages represent a significant cost savings over prior art systems. Safety restraint systems 20 or 42 also allow each device to be selectively disabled without removing its stored energy device 30 or 56.

Figure 2:
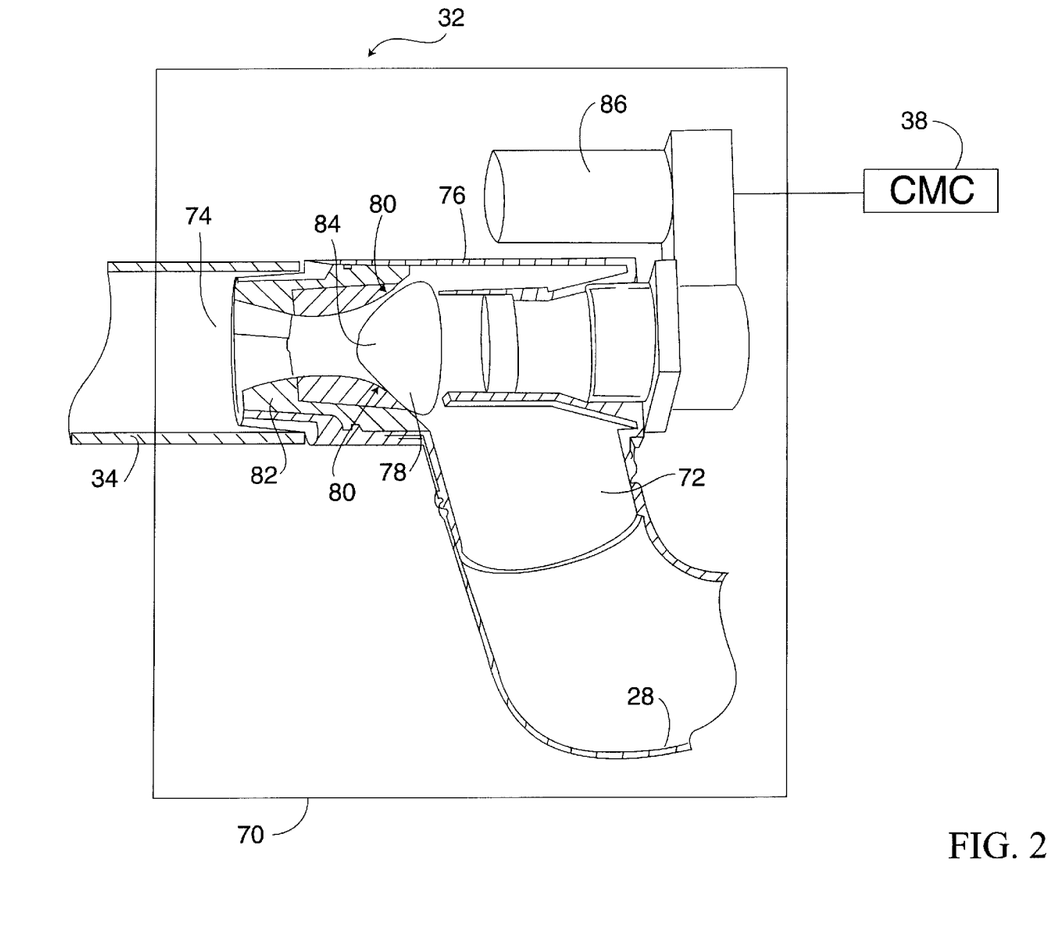
FIG. 2 is a partial sectional view of a control valve module in accordance with the present invention.

FIG. 2 discloses the detailed components of valve modules 32 and 58 which are substantially similar to each other, and will be described with reference only to pintle valve module 32. Preferably, pintle valve module 32 is contained within a housing 70 having an inlet 72 for connecting to the manifold 28 or 54, and an outlet 74 for delivering pressurized gas to its associated conduit. The valve body 76 includes a pintle member 78 for engaging a valve seat 80 and controlling the flow of pressurized gas through a nozzle 82. As disclosed, pintle member 78 includes a rounded tip 84 which reduces the effects of turbulence within valve body 76. The opposite end of pintle member 78 is connected to an actuator 86 which controls the axial position of pintle member 78 within valve body 76 in response to an electrical control signal received from crash management controller 38. Preferably, actuator 86 is a stepper motor for controlling the axial movement of pintle member 78 within valve body 76. However, actuator 86 may also be a solenoid or electromagnet, connected directly to the pintle member 78 or an extending stem thereof, responsive to an electrical signal produced by crash management controller 38 for controlling the axial position of pintle member 78 relative to valve seat 80.

In operation, actuator 86 maintains pintle member 78 in a retracted or open position when maximum flow of pressurized gas through nozzle 82 is required. However, the flow of pressurized gas is restricted or completely inhibited when actuator 86 places pintle member 78 in an extended or closed position for contacting valve seat 80. Moreover, actuator 86 is capable of maintaining pintle member 78 in any position within its operating range for controlling the flow of pressurized gas for any period of time. Accordingly, actuator 86 can modulate the position of pintle member 78 between its open and closed positions for adaptively changing the deployment force of its associated air bag or safety restraint device.

Figure 3A:
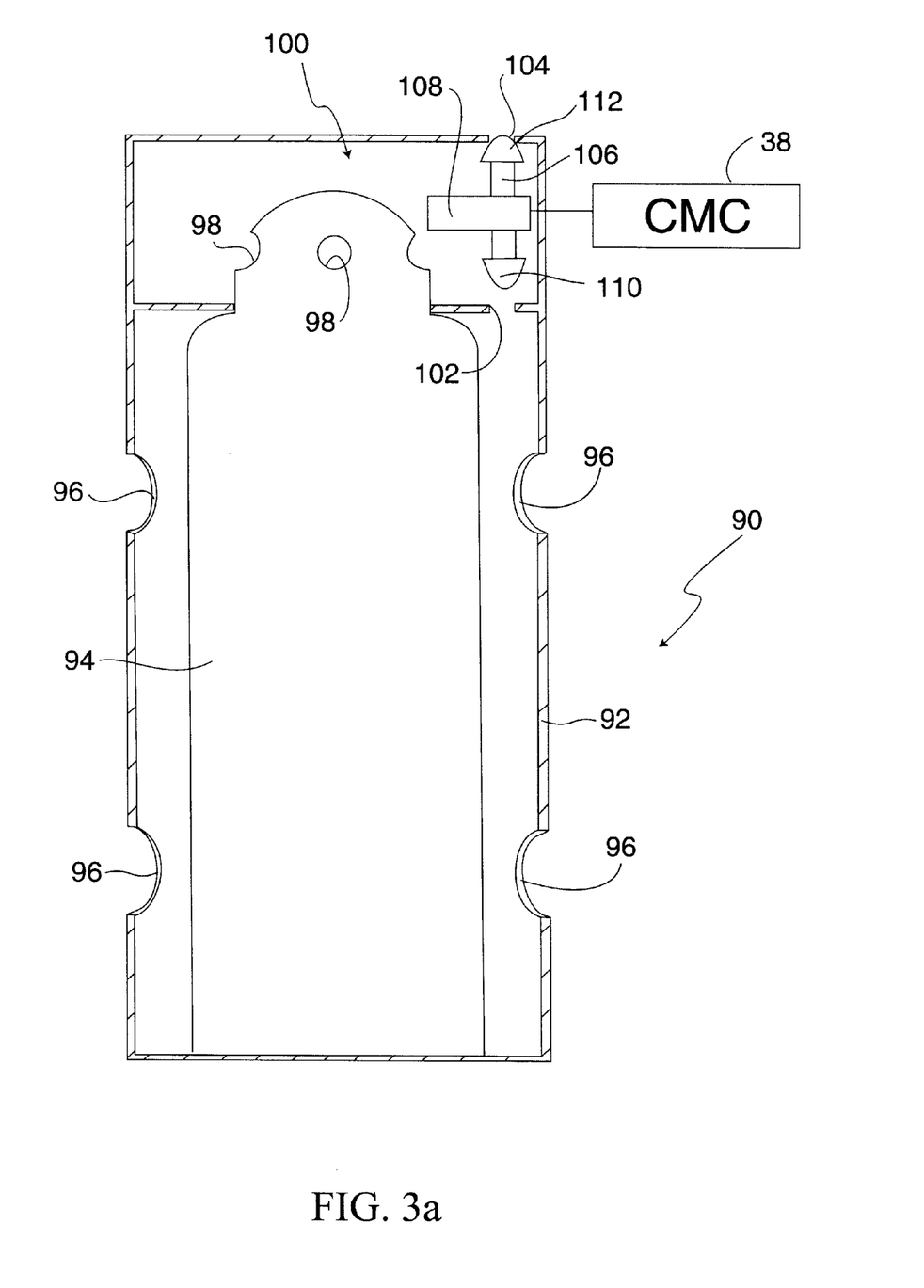
FIGS. 3A–3C are partial sectional views of an air bag inflator having a throttling or control valve associated therewith for regulating the inflator output in accordance with the present invention.
Figure 3B:
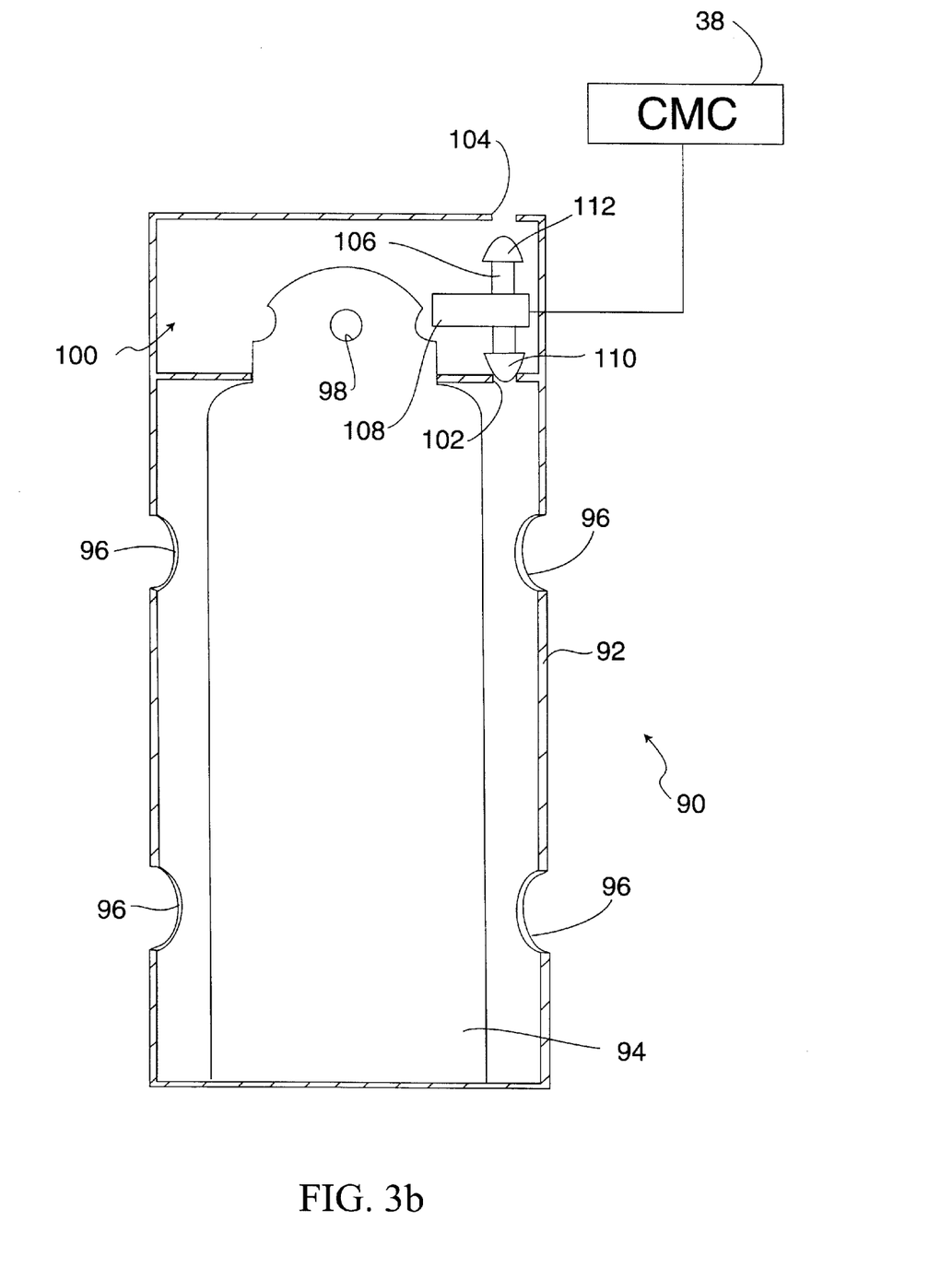
Figure 3C:
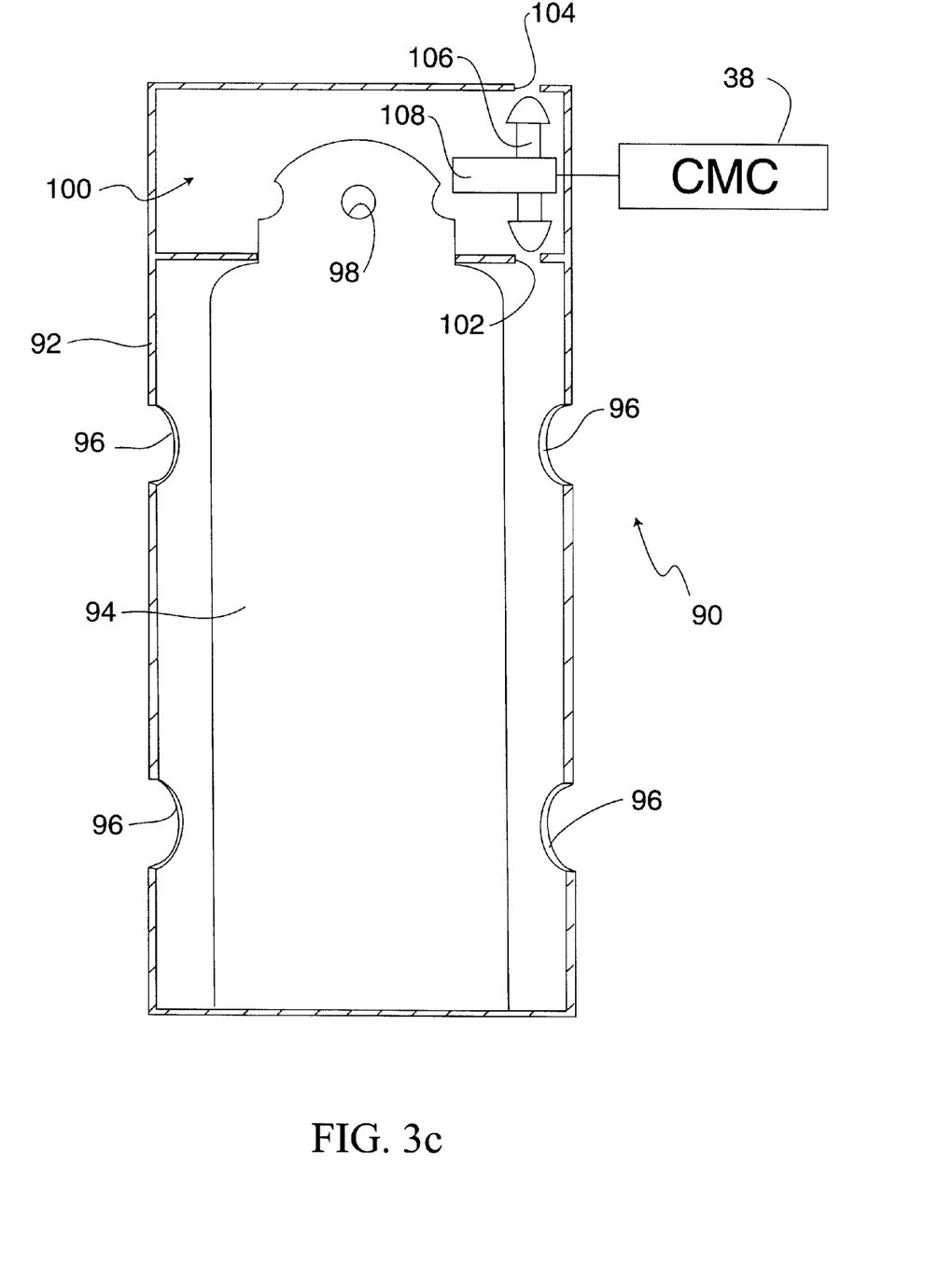

Referring now to FIGS. 3A–3C, an alternate embodiment of the present invention is disclosed. More specifically, FIGS. 3A–3C show the pintle valve arrangement associated with an inflator assembly 90 which is generally defined by a manifold 92 for housing a stored energy device 94. Preferably, stored energy device 94 is also a pyrotechnic inflator which releases a flow of pressurized gas upon activation. Manifold 92 includes a plurality of exhaust ports 96 which direct pressurized gas from stored energy device 94 into an air bag or conduit network (not shown) connected to manifold 92. As disclosed, manifold 92 includes four exhaust ports 96. However, one skilled in the art will appreciate that exhaust ports 96 can take on a variety of configurations dictated by the specific application for inflator assembly 90.

The top of stored energy device 94 includes a plurality of apertures 98 for releasing pressurized gas into a valve chamber 100 which in turn controls the amount of gas directed into manifold 92 for inflating the associated air bag. More specifically, valve chamber 100 includes a discharge port 102 for directing gas into manifold 92, and a venting port 104 for directing gas away from inflator assembly 90 and the safety restraint system. A pintle valve member 106 is supported for axial movement within valve chamber 100 for adaptively changing the output characteristics of inflator 90.

Pintle valve member 106 is generally defined by a lower pintle end 110 for engaging discharge port (valve seat) 102 and an upper pintle end 112 for engaging venting port (valve seat) 104. The axial position of pintle member 106 is controlled by an actuator 108 in response to an electrical control signal sent to actuator 108 from the vehicle's crash management controller (CMC) 38. Preferably, actuator 108 is a solenoid or stepper motor for controlling the axial movement of pintle valve member 106 within valve body 100.

In operation, pintle valve member 106 can be moved between an upper position (FIG. 3A) for directing the maximum amount of pressurized gas into manifold 92 through discharge port 102 and a lower position (FIG. 3B) for venting the pressurized gas away from manifold 92 through venting port 104. Pintle valve member 106 can also be located into any position within its range of motion for generating a range of output force to an attached safety restraint device (not shown) through manifold 92. This intermediate position (FIG. 3C) for pintle member 106 allows pressurized gas to flow simultaneously through primary port 102 and venting port 104 for deploying the attached safety restraint device with reduced force. The position of pintle member 106 is also determined by CMC 38 in response to various sensors which determine the severity of impact, such as crash sensors 35 and occupant position sensors 37 as discussed above.

Figure 4:
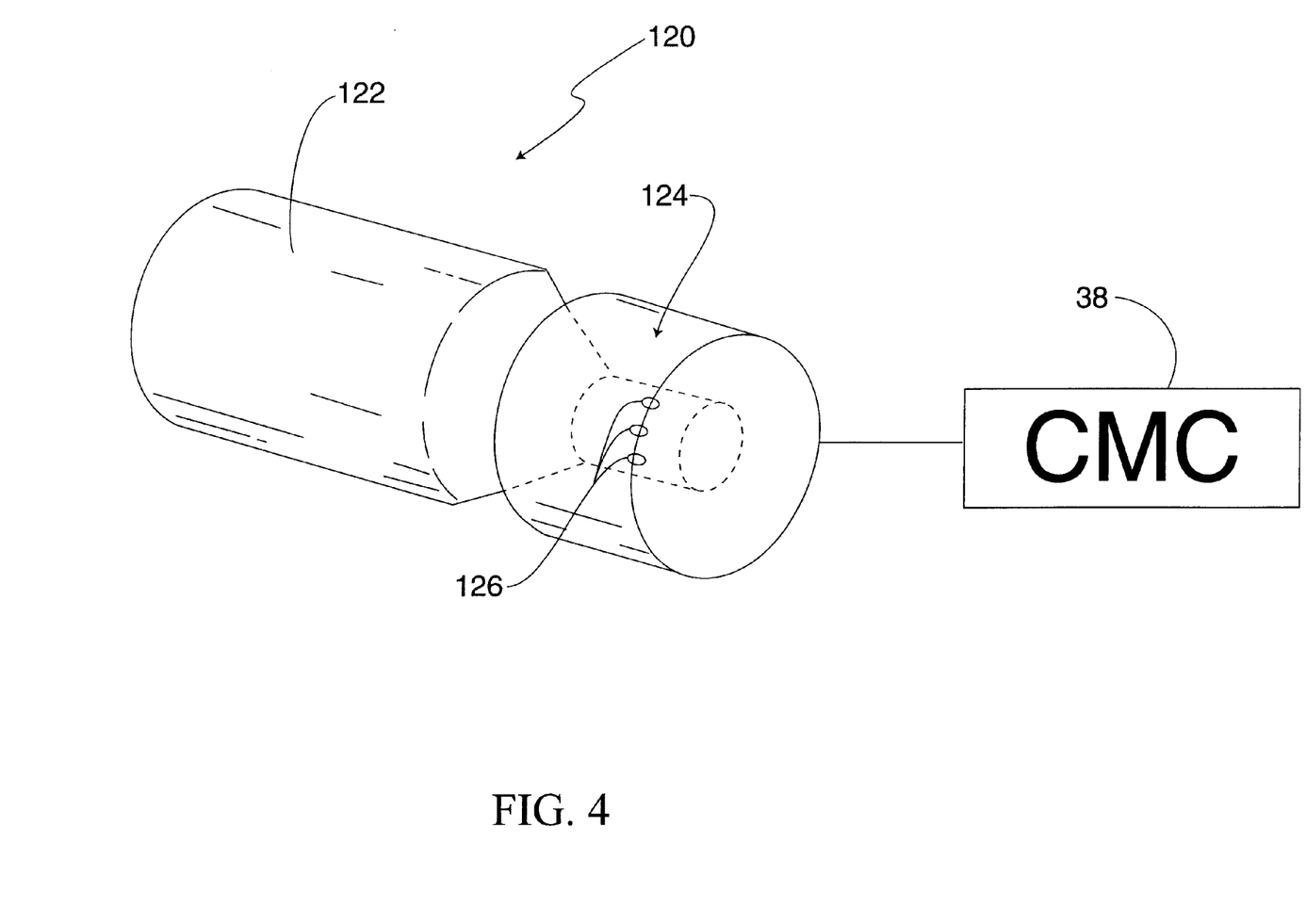
FIG. 4 is a perspective view of a cylindrical air bag inflator having a throttling or control valve device for controlling the inflator output in accordance with a preferred embodiment of the present invention.

With reference now to FIGS. 4 through 7, another preferred embodiment of the present invention is shown. FIG. 4 discloses a cylindrical inflator 120 as including a stored energy chamber 122 for releasing pressurized gas upon activation by crash management controller 38. The flow of pressurized gas is controlled by a pintle valve assembly 124 which is securely positioned for fluid communication with a plurality of exhaust ports 126 formed about the neck of stored energy chamber 122.

Figure 5:
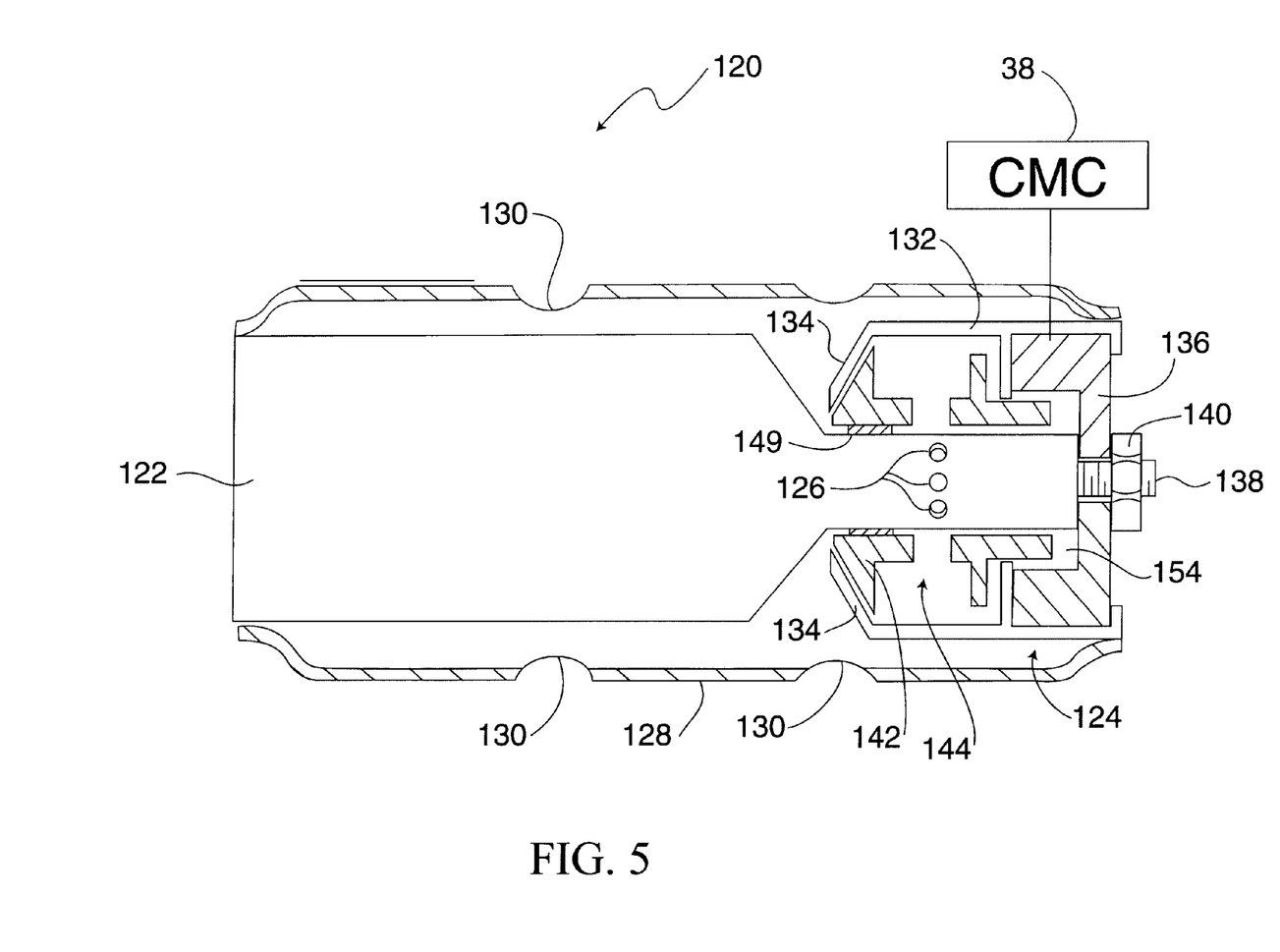
FIG. 5 is a partial sectional view of the air bag inflator and throttling or control valve device shown in FIG. 4.

FIG. 5 shows pintle valve assembly 120 with a cylindrical air bag inflator 122 and a manifold 128 having a plurality of apertures 130 formed therein. Air bag pintle valve assembly 124 is generally defined by a valve body 132 which provides the primary structure to pintle valve assembly 124. The inboard end of valve body 132 is inwardly tapered to define an annular valve seat 134. The outboard end of valve body 132 is securely attached to actuator 136, which is in turn secured to a threaded shaft 138 of the inflator 122 with a nut 140. Pintle member 142, preferably metal, is axially supported by stored energy device 122, and also supported within valve body 132. A plurality of flow orifices 144 are formed around a neck portion 146 of pintle member 142 which communicate with exhaust ports 126 for allowing pressurized gas to flow therethrough during deployment of the inflator 122.

Actuator 136 is preferably a solenoid for controlling the axial position of pintle member 142 with respect to valve seat 134. When pintle member 142 is moved away from actuator 136, pintle end 148 engages valve seat 134 for restricting or blocking the flow of pressurized gas from pintle valve assembly 124. When actuator 136 retracts pintle member 142 such that pintle end 148 is displaced from valve seat 134, pressurized gas flows through orifices 144 and out pintle valve assembly 124 into manifold 128 which directs the pressurized gas into the associated safety restraint device via apertures 130. A gasket or seal 149 may optionally be provided between stored energy device 122 and pintle member 142.

Figure 6:
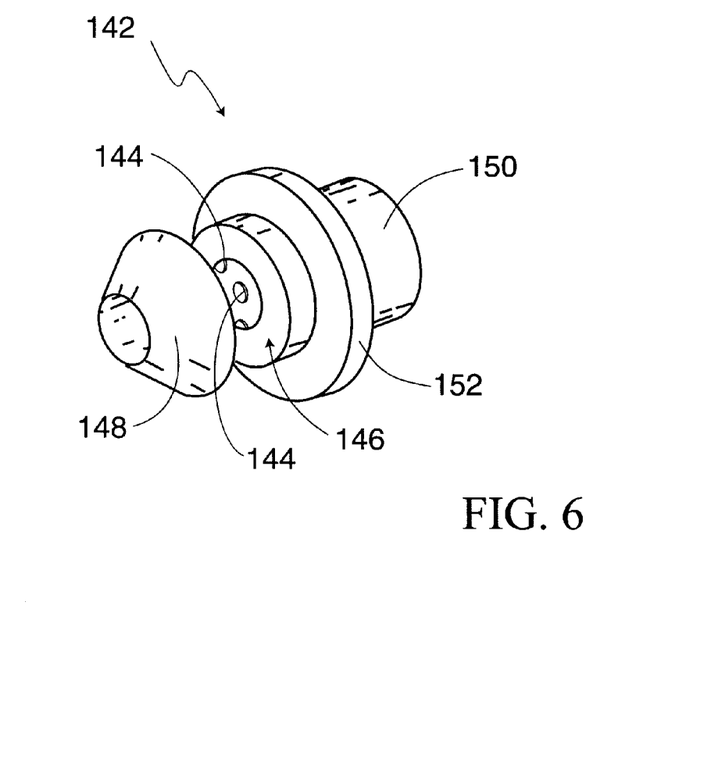
FIG. 6 is a perspective view of the throttling or control member according to a preferred embodiment of the present invention.
Figure 7:
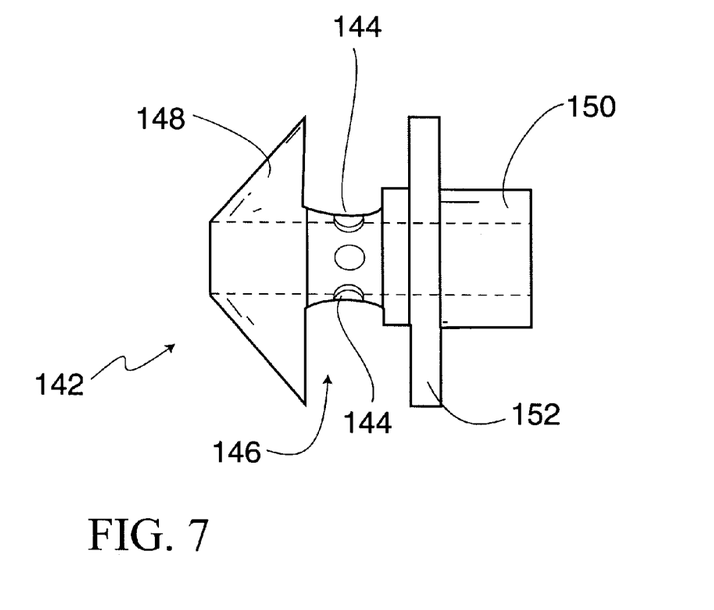
FIG. 7 is a side elevational view of the throttling or control member shown in FIG. 6.

FIGS. 6 and 7 further disclose the various features of pintle member 142. More specifically, the axial body 150 sits within a recess 154 of actuator 136. This feature facilitates the interaction between pintle member 142 and actuator 136 for controlling the extended or retracted position of pintle member 142. The annular collar 152 further assists in supporting pintle member 142 within valve body 132. Pintle end 148 is also shown to include a large surface area for engaging valve seat 134 and creating a tight seal when pintle member 142 is fully extended by actuator 136.

Figure 8:
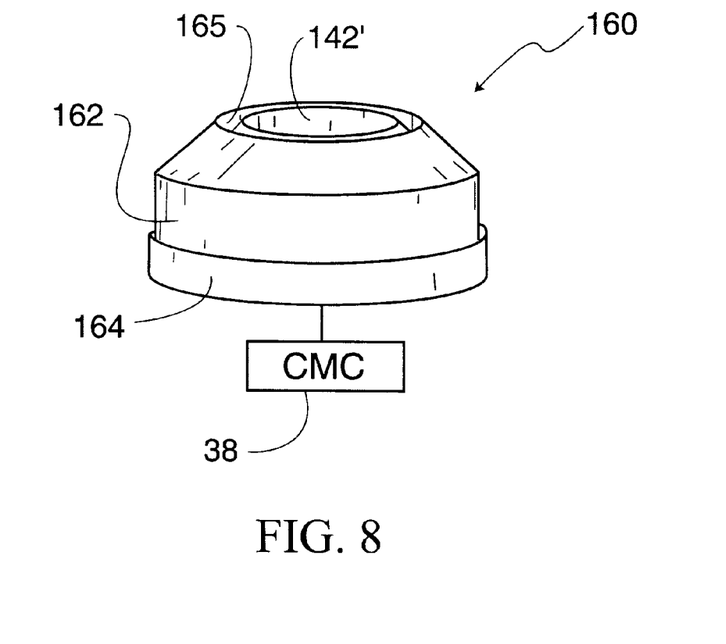
FIG. 8 is a perspective view of a toroidal-shaped air bag inflator having a throttling or control valve device for controlling the inflator output in accordance with another preferred embodiment of the present invention.
Figure 9:
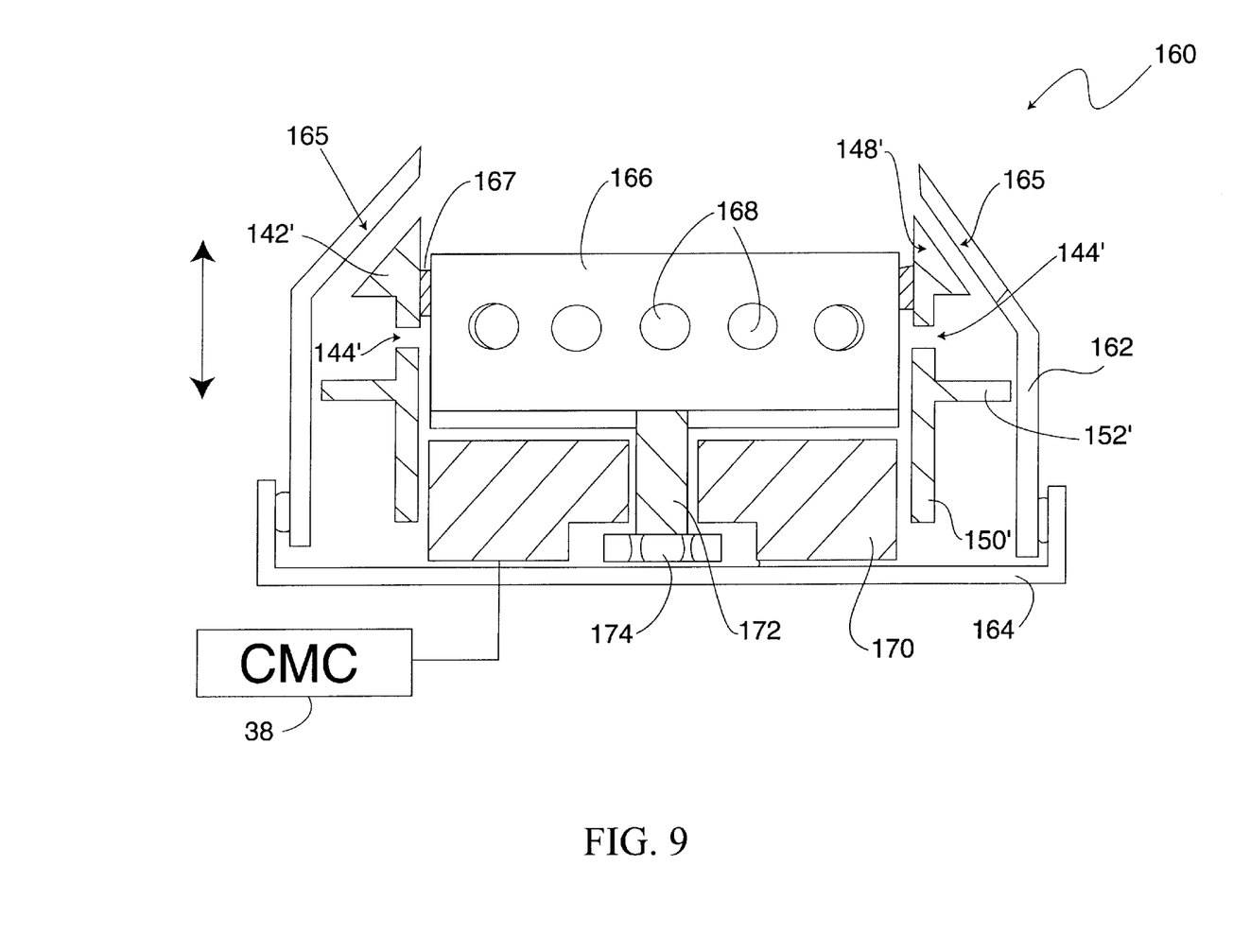
FIG. 9 is a partial sectional view of the air bag inflator and throttling or control valve device shown in FIG. 8.
Figure 10:
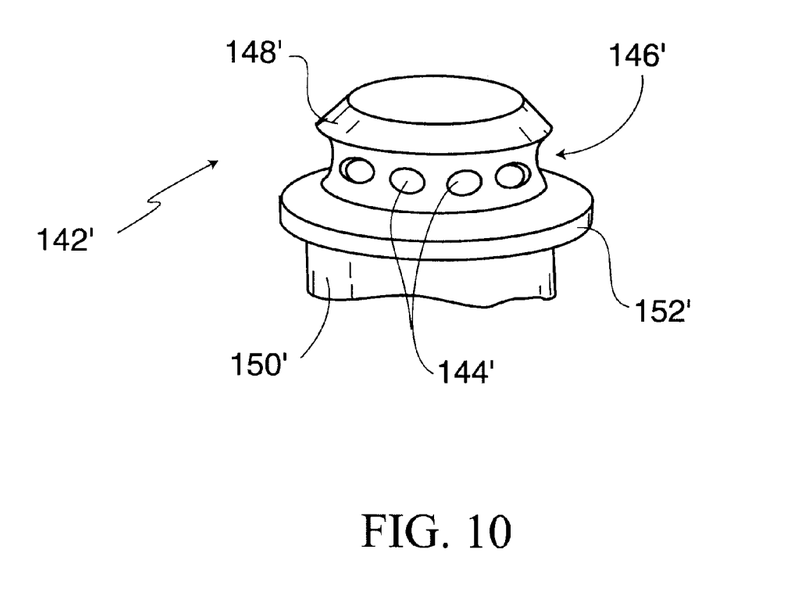
FIG. 10 is a perspective view of the throttling or control member according to a preferred embodiment of the present invention.

Turning now to FIGS. 8 through 10, an alternate construction of the pintle valve controlled inflator is shown in accordance with the preferred embodiment of the present invention. FIG. 8 discloses a toroidal inflator 160 which is generally defined by a tapered valve body 162 and a cover plate 164 which when assembled forms a two-piece enclosure. A stored energy device 166, such as a pyrotechnic inflator, is secured within toroidal inflator 160 and discharges pressurized gas upon activation by crash management controller 38. Inflator 160 is typically included as the inflator component of an air bag module integrated into the central portion of a vehicular steering wheel, such as steering wheel 46 shown in FIG. 1B.

FIG. 9 shows details associated with the components of toroidal inflator 160. More specifically, the tapered end of valve body 162 defines an annular valve seat 165. The stored energy device 166 contained within inflator 160 includes a plurality of exhaust ports 168 around the outer circumference thereof. The stored energy device 166 also includes a threaded shaft 172 which allows for securement of actuator 170 with a nut 174.

Pintle member 142', also preferably metal, is axially supported by actuator 170 and stored energy device 166, and also supported within valve body 162. A gasket or seal 167 may optionally be provided between stored energy device 166 and pintle member 142'. A plurality of flow orifices 144' are formed around the neck portion 146' of pintle member 142' which communicate with exhaust ports 168 for allowing pressurized gas to flow therethrough during activation of the stored energy device 166 within toroidal inflator 160.

Actuator 170 is also preferably a solenoid for controlling the axial position of pintle member 142' with respect to valve seat 165 in response to an electrical control signal from crash management controller 38. It should be understood that pintle member 142' and its associated features are substantially similar to pintle member 142, the primary difference being that pintle member 142' is designed to operate within and to the specifications of toroidal inflator 160. When pintle member 142' is moved away from actuator 170, pintle end 148' engages valve seat 165 for blocking the flow of pressurized gas from toroidal inflator 160. When actuator 170 retracts pintle member 142' away from valve seat 165, pressurized gas flows through orifices 144' and out toroidal inflator 160 for directing the pressurized gas into the associated air bag or safety restraint device. Additionally, actuator 170 may control the operation of toroidal inflator 160 by modulating the osition of pintle member 142' within valve body 162 for correspondingly modulating the flow of pressurized gas therefrom.

FIG. 10 further discloses the features and overall shape of pintle member 142'. The axial body 150' interacts with actuator 170 for controlling the extended or retracted position of pintle member 142'. The annular collar 152' further assists in supporting pintle member 142' within valve body 162. Pintle end 148' is shown to include a large surface area for engaging valve seat 164 and creating a tight seal for restricting the flow of pressurized gas when pintle member 142' is fully extended.

Figure 11:
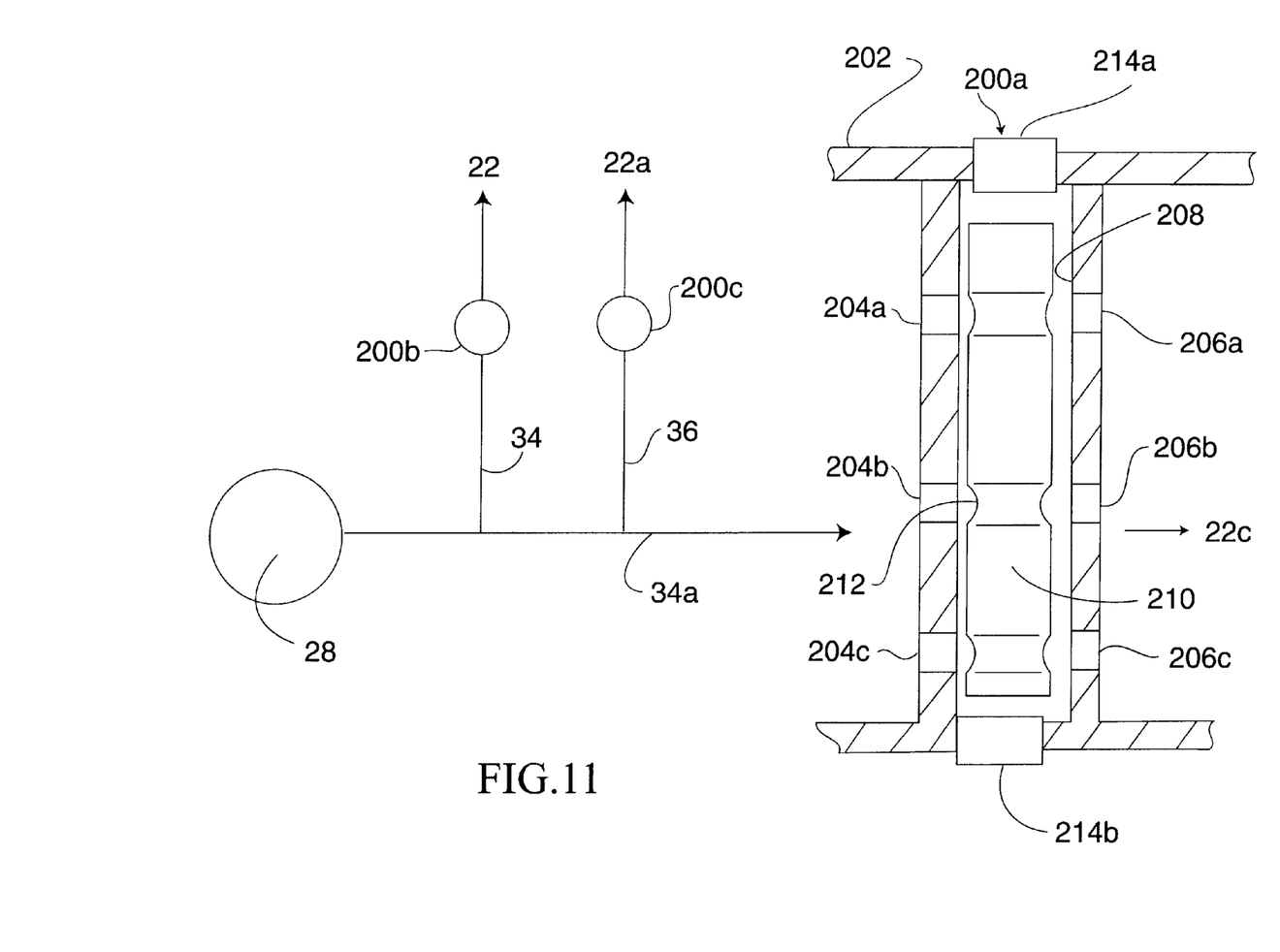
FIG. 11 shows a partial sectional view of an alternate valve.

FIG. 11 illustrates an alternate embodiment of the present invention. More specifically, a plurality of spool valves 200a, b, c is used to control fluid communication to corresponding safety restraint device, for example devices 22, 22a and 22c. Each of the valves 200a, b and 200c are of identical construction and consequently only valve 200a will be described in detail. A central energy source such as a single inflator 28 is communicated via a plurality of conduits 34, 34a and 36 to each safety restraint device through an associated valve 200a,b,c. The valve 200a includes a valve body 202 in fluid communication with its associated conduit such as 34a and to a device such as 22c. The body includes a plurality of input ports such as 204a–c and a plurality of output ports such as 206a–c. A spool 210 is situated within a bore 208 of the body 202. The spool 210 is of a magnetic material such as steel, having a like plurality of grooves 212. Situated within the body 202 are two opposingly located electromagnets 214a,b. As each electromagnet is activated, the spool 210 is shuttled up and down selectively opening and closing ports 204a–c and 206a–c to control the amount of fluid (inflation gas) communicated to the safety restraint device dependent upon the duty cycle of a control signal(s) controlling the electromagnets 214a and 214b.

Reference is briefly made to Table 1 which illustrates the operational inflation strategy to be used when activating one or more safety restraint devices during a selected type of accident such as a frontal impact, a side impact, a rear impact and a rollover crash. For example if the various crash sensors within and about the vehicle identify the crash event as a frontal impact (frontal crash) then the various valve modules connected to the designated restraint device, identified below, would be activated to protect the occupant in the selected type of crash event. In the case of a frontal impact the activation of the valve controlling the inflation of the rear impact bag 22a would be delayed a predetermined amount of time relative to the activation of the frontal air bag to prevent the occupant from rebounding. Similarly, in a rear impact the activation of the frontal air bag would be delayed.

TABLE 1

Safety Restraint System Deployment

|  | Frontal Impact Crash | Side Impact Crash | Rear Impact Crash | Rollover Crash |
|---|---|---|---|---|
| Seat Mounted Valve/Restraint Component | | | | |
| Side air bag | | X | | X |
| Rear impact air bag | X | | X | |
| Buckle pretensioner | X (and/or retractor PT) | | X (and/or retractor PT) | X (and/or retractor PT) |
| Retractor pretensioner | X (and/or buckle PT) | | X (and/or buckle PT) | X (and/or buckle PT) |
| Center-side air bag | | X | | X |
| Thigh air bag | X | | | |

TABLE 1-continued

Safety Restraint System Deployment

| | Frontal Impact Crash | Side Impact Crash | Rear Impact Crash | Rollover Crash |
|---|---|---|---|---|
| Instrument Panel Valve/Restraint Component | | | | |
| Frontal air bag | X | | X | |
| Passenger frontal air bag | X | | X | |
| Passenger knee air bag/bolster | X | | | |
| Driver knee air bag/bolster | X | | | |

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. An adaptively controlled safety restraint system (20) comprising:
   at least one safety restraint device (22, 24) operative in response to a flow of pressurized gas;
   fluid means (28) in fluid communication with the safety restraint device (22, 24) for providing, over a determinable interval, energy to drive the safety restraint device (22, 24) to an activated state of operation; and
   high speed solenoid valve means (32, 58), associated with each such safety restraint device, disposed between the fluid means (28) and the safety restraint device (22, 24) for controlling the level of energy communicated to the safety restraint device from the fluid means;
   controller means for generating at least one control signal to modulate the valve means only during the interval to affect the level of energy communicated.

2. The safety restraint system of claim 1 including a conduit (34, 60) for directing the pressurized gas from the fluid means (28) to the safety restraint device (22, 24).

3. The safety restraint system of claim 2 wherein the valve means (32, 58) is disposed along the conduit (34, 60).

4. The safety restraint system of claim 1 wherein the valve means (32, 58) includes a valve member (78) operably associated with the actuator (86), and a valve body (76) for supporting the valve member (78), the valve body (76) including a valve seat (80) for engaging the valve member (78).

5. The system as defined in claim 1 wherein the valve means is not vented to atmosphere.

6. The safety restraint system of claim 1 wherein the valve means (32, 58) includes a valve member (106) operably associated with the actuator (108), and a valve body (100) for supporting the valve member (106), the valve body (100) including a discharge port (102) for directing the flow of pressurized gas into the safety restraint device (22, 24) and a venting port (104) for directing the flow of pressurized gas away from the safety restraint device (22, 24).

7. The safety restraint system of claim 6 wherein the valve member (106) is positionable by the actuator (108) between a first position for allowing pressurized gas to flow through the discharge port (102), and a second position for allowing pressurized gas to flow through the venting port (104).

8. The safety restraint system of claim 7 wherein the valve member (106) is positionable by the actuator (108) into a position intermediate the first position and the second position for allowing pressurized gas to flow simultaneously through the discharge port (102) and the venting port (104).

9. The system as defined in claim 1 wherein the safety restraint device includes at least one of a seat belt component and at least one air bag component.

10. The system as defined in claim 1 wherein the valve means is caused to remain in a null position prior to and until activation of the fluid means.

11. The system as defined in claim 1 wherein the fluid means includes one common source of fluid for a plurality of safety restraint devices, wherein one valve means is associated with each such device.

12. The system as defined in claim 1 wherein the fluid means and valve means are closely associate and wherein the fluid means comprises:
   a housing having at least one gas flow port through which gas is delivered;
   a port enclosure, covering the gas flow port, the enclosure including a first aperture communicated to atmosphere and a second aperture;
   the valve means being situated within the port enclosure for selectively opening and closing one or the other of the first and second openings;
   a manifold positioned about the fluid means in fluid communication with the second opening to receive gas when the second aperture is open; the manifold further including at least one exit port to communicate gas to the restraint device.

13. The system as defined in claim 1 wherein the at least one safety restraint device includes a plurality of air bag components including a rear impact air bag mounted in a seat back, and at least one frontal air bag mounted forward of the seat, wherein during an accident the controller means activates the fluid means and generates a first signal to a first valve to affect inflation of the frontal air bag and generates a second signal to a second valve to affect inflation of the rear impact air bag, wherein in the case of a frontal accident the second signal is delayed relative to the first signal and during a rear impact accident the first signal is delayed relative to the second signal.

14. The system as defined in claim 13 wherein the plurality of restraint devices further includes an outboard, seat mounted side impact air bag, and an inboard, seat mounted side impact air bag wherein during a side impact collision the controller generates a third signal to affect inflation of the outboard side impact air bag and a fourth signal to affect inflation of the inboard side impact air bag.

15. An adaptively controlled safety restraint system (20, 42) activated by a crash management controller (38) of a vehicle comprising:

a plurality of safety restraint devices (20, 24) for deployment within a passenger compartment (16) of the vehicle, the safety restraint devices (20, 24), including at least one seat belt component and at least one air bag component, operative in response to a flow of pressurized gas;

fluid means (28) having a stored energy device (30) which can be activated for generating the flow of pressurized gas for driving the safety restraint devices (20, 24);

a plurality of conduits (34, 36) in fluid communication with the fluid means (28) and connected to the plurality of safety restraint devices (20, 24) for delivering the flow of pressurized gas thereto;

a valve assembly (32, 58) disposed along each conduit (34, 36) for controllably varying the flow of pressurized gas to each safety restraint device (20, 24); and an actuator (86) for controlling the position of the valve assembly (32, 58), the actuator (86) operable in response to an electrical signal received from the crash management controller (38).

16. The safety restraint system of claim 15 wherein the valve assembly (32, 56) is a high-speed solenoid valve (32).

17. An adaptively controlled safety restraint deployment system comprising:

fluid means (120, 160) for deploying a safety restraint device, for producing pressurized gas which is discharged through at least one outlet port (126, 168);

high speed solenoid valve means (132, 162) secured to the fluid means (120), for selectively opening the at least one outlet port;

control means for generating at least one control signal to vary the position of the valve means relative to the outlet port to regulate the rate of discharge of gas from the fluid means.

18. The system as defined in claim 17 wherein the fluid means includes; a housing and the at least one outlet port is arranged to direct gas flow in a first direction and wherein the valve means includes a valve element, disposed relative to the at least one outlet port and movable in a direction generally perpendicular to the first direction.

19. The system as defined in claim 18 wherein the fluid source includes an elongated, cylindrically shaped housing and wherein the outlet port is positioned to cause the gas to flow radially relative to a longitudinal axis of the housing and wherein the valve element moves generally parallel to the axis thereby opening and closing the outlet port.

20. The system as defined in claim 18 wherein the fluid means includes a toroidally shaped housing having a central opening on one side thereof oriented generally perpendicular to a central axis of the housing, wherein a plurality of outlet ports are disposed below the central opening and arranged to cause the gas to flow radially relative the axis and then through the central opening, wherein the valve means is disposed about the exit ports, between the exit ports and the housing, wherein the valve element moves parallel to the axis to open and close communication between the ports and the central opening.

* * * * *